(12) United States Patent
Cipolla et al.

(10) Patent No.: US 11,313,875 B1
(45) Date of Patent: Apr. 26, 2022

(54) COMPACT DUAL BEAM VECTOR SENSOR

(71) Applicant: The United States of America as represented by the Secretary of the Navy, Newport, RI (US)

(72) Inventors: Kimbery M Cipolla, Portsmouth, RI (US); Charles M Traweek, Saint Leonard, MD (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 17/029,100

(22) Filed: Sep. 23, 2020

(51) Int. Cl.
| | | |
|---|---|---|
| *G01P 15/09* | (2006.01) | |
| *H01L 41/18* | (2006.01) | |
| *G01P 15/08* | (2006.01) | |

(52) U.S. Cl.
CPC .......... *G01P 15/0922* (2013.01); *H01L 41/18* (2013.01); *G01P 2015/0882* (2013.01)

(58) Field of Classification Search
CPC ......... G01P 15/0922; G01P 2015/0882; H01L 41/18
See application file for complete search history.

(56) References Cited

U.S. PATENT DOCUMENTS

| | | | | |
|---|---|---|---|---|
| 2005/0034519 A1* | 2/2005 | Deng | .................. | G01P 15/0915 73/514.34 |
| 2011/0105955 A1* | 5/2011 | Yudovsky | ............... | G01P 15/09 600/595 |

* cited by examiner

*Primary Examiner* — Xin Y Zhong
(74) *Attorney, Agent, or Firm* — James M. Kasischke; Michael P. Stanley

(57) ABSTRACT

A pair of vector sensors are provided and mounted orthogonally to each other. Each vector sensor includes a central structural member having a first end and a second end. The central structural member has four symmetric arms oriented at 90° to each other. A crystalline plate is attached perpendicular to a distal end of each arm of the central structural member. The first end of each vector sensor is embedded in a socket of a proof mass. The second end of each vector sensor is embedded in an aperture of a cubic base.

1 Claim, 6 Drawing Sheets

COMPACT DUAL BEAM VECTOR SENSOR

STATEMENT OF GOVERNMENT INTEREST

The invention described herein was made in the performance of official duties by employees of the United States Department of the Navy and may be manufactured, used, or licensed by or for the Government of the United States of America for any governmental purpose without payment of any royalties thereon.

CROSS REFERENCE TO OTHER PATENT APPLICATIONS

None.

BACKGROUND OF THE INVENTION

(1) Field of the Invention

The present invention is directed to acoustic sensor design, and in particular to a sensor for measuring the three directional components of acceleration in a single, compact package.

(2) Description of the Prior Art

Traditionally, acoustic signals are acquired by using omnidirectional hydrophones to measure a pressure field. A vector sensor is an underwater listening device that detects sounds in water and converts acoustic energy into electrical energy. Vector sensors differ from hydrophones in that vector sensors can measure both the particle motion and pressure changes associated with a sound wave, while hydrophones measure only pressure changes.

A vector sensor can measure the acoustic pressure and the three components of particle velocity. Assembled into an array, a vector sensor array improves spatial filtering capabilities when compared with arrays of the same length and same number of hydrophones. Individual hydrophones are not sensitive to direction; thereby, making it necessary to construct hydrophone arrays with a plurality of hydrophones combined with signal processing algorithms in order to determine the direction in which a sound wave is traveling. In contrast, vector sensors can determine the direction in which a sound wave is traveling using measurements made at a single point in space.

Acoustic noise in the ocean is characterized by a noise spectral density curve derived from omnidirectional pressure transducer measurements. The response of an acoustic sensor to this noise field depends upon the directivity of the sensor. A directional sensor having the same plane wave pressure sensitivity along its axis as an omnidirectional sensor will generally give a lower response in a noise field because events arriving off the main axis are attenuated by a decrease in sensitivity away from the sensor axis.

Stated another way, a directional sensor has inherent noise rejection, such that a plane wave with an amplitude equal to the ambient noise field acceleration directed along the axis of the sensor amplitude generates a larger signal than the ambient noise field itself.

Assuming the noise is generated from distant sources; the plane wave impedance $\rho c$ suffices to convert the pressure amplitude to velocity amplitude. Specifically, $v=p/\rho c$, where $v$ is the magnitude of the acoustic particle velocity, $p$ is the magnitude of the acoustic pressure, $\rho$ is the density of the fluid, and $c$ is the phase speed of sound waves in the fluid. As an estimate, use $\rho=1000$ kg/m$^3$ and $c=1500$ m/s, such that $\rho c=1.5E6$ kg/m$^2$s.

To determine a natural signal-to-noise gain due to the directivity of the acceleration sensor; the response of an acceleration sensor in the ambient diffuse noise field is compared to the response of an omni-directional sensor to the same field. If the voltage from the omni-directional acceleration sensor is expressed as $V_{omni}=\gamma a(t)$, where $\gamma$ is the sensitivity factor for the accelerometer in terms of voltage/acceleration, then the time-averaged signal intensity $I_{omni}$ of the omni-directional acceleration sensor is:

$$I_{omni} = \int_0^{2\pi} \int_0^{\pi} \frac{1}{T} \int_{-\frac{T}{2}}^{\frac{T}{2}} [\gamma a(t)]^2 dt d\theta d\varphi = \gamma^2 a_{rms}^2 (2\pi^2). \quad (1)$$

In Equation (1), $a_{rms}$ is the root mean squared acceleration magnitude independent of direction which is defined by the latitudinal and longitudinal spherical angular coordinates, $\theta$ and $\varphi$ respectively.

A practical accelerometer is sensitive to accelerations in proportion to the orthogonal projection of the particle acceleration vector upon the sensitive axis of the sensor, which may be the z-axis, or the axis about which azimuthal rotations $\varphi$ are defined. The voltage response is then proportional to the cosine of the angle that the acceleration vector makes with this axis, namely $V_z(t)=\gamma a(t) \cos \theta$. The signal intensity $I_z$ of the accelerometer is then, $$I_Z = \int_0^{2\pi} \int_0^{\pi} \frac{1}{T} \int_{-\frac{T}{2}}^{\frac{T}{2}} [\gamma a(t) \cos\theta]^2 dt d\theta d\varphi \quad (2)$$

$$I_Z = 2\pi \gamma^2 a_{rms}^2 \int_0^{\pi} \cos^2\theta d\theta \quad (3)$$

Using the identity, $$\cos^2\theta = \frac{1}{2} + \frac{1}{2}\cos 2\theta,$$

$$I_Z = 2\pi \gamma^2 a_{rms}^2 \int_0^{\pi} \left(\frac{1}{2} + \frac{1}{2}\cos 2\theta\right) d\theta \quad (4)$$

or, equivalently $$I_Z = 2\pi \gamma^2 a_{rms}^2 \frac{\pi}{2} = \gamma^2 a_{rms}^2 (\pi^2) = V_{omni}/2 \quad (5)$$

The signal-to-noise gain is then a factor of two with respect to the omni-directional intensity estimate. This is a natural signal-to-noise gain afforded by the directivity of the sensor.

It is therefore desirable to have a compact vector sensor device that reflects the advantages above with high sensitivity, a low noise floor with the sensor having minimal size and weight.

SUMMARY OF THE INVENTION

The present disclosure offers a sensor design for measuring the three components of acceleration in a single, compact package. Specifically, the disclosure provides the constraints and requirements to develop the sensor design and describes one embodiment of the concept achieved with typical engineering norms.

In order for a vector sensor to be useful for naval applications, the sensor must have a high sensitivity and a low noise floor with minimal size and weight. In addition, the sensor performance must be consistent and repeatable over the frequency band of interest.

The present invention provides a sensor compatible with towed array applications. Comparison with existing vector sensor designs reveals a reduced number of components and therefore an associated reduction in the cost to manufacture and assemble the sensor. Despite the reduction in cost, weight and size; the dual beam configuration can be designed to meet the requirements for resonant frequency and electronic noise.

According to an aspect of the invention, an underwater acoustic receiver sensor includes a housing defining an interior. A pair of dual beam vector sensors are mounted orthogonally to each other in the housing interior with the housing being neutrally buoyant.

For an inventive method described herein, sensor signals representative of sensed acoustic velocity are collected from a plurality of dual beam vector sensors. The vector sensors comprise an array of acoustic sensing elements. The sensor signals are processed to a separate acoustic response for each element of the acoustic sensing array. The acoustic response for each element of the array is displayed.

According to a method of use of an exemplary device herein, a produced first vector sensor beam has a first end and a second end. The first vector sensor beam comprises an elongated cruciform shape having four arms oriented at 90° to each other. A first plurality of crystalline plates are operationally connected perpendicular to a distal end of each arm of the first vector sensor.

A second vector sensor of the present invention has a first end and a second end. The second vector sensor comprises an elongated cruciform shape having four arms oriented at 90° to each other. A second plurality of crystalline plate are operationally connected perpendicular to a distal end of each arm of the second vector sensor.

A first proof mass includes a first socket. The first end of the first vector sensor embeds in the first socket. A second proof mass includes a second socket. The first end of the second vector sensor embeds in the second socket. A cubic base has an aperture in each face of the base. The second end of the first vector sensor embeds in a first aperture and the second end of the second vector sensor embeds in a second aperture. The first vector sensor and the second vector sensor are arranged orthogonal to each other.

BRIEF DESCRIPTION OF THE DRAWINGS

Features of illustrative embodiments may be understood from the accompanying drawings in conjunction with the detailed description. The elements in the drawings may not be drawn to scale. Some elements and/or dimensions are enlarged or minimized for the purpose of illustration and the understanding of the disclosed embodiments.

DETAILED DESCRIPTION OF THE INVENTION

The invention summarized above is better understood by referring to the following description, which is read in conjunction with the accompanying drawings in which like reference numbers are used for like parts. This description of an embodiment, set out below to enable one to practice an implementation of the invention, is not intended to limit the preferred embodiment, but to serve as a particular example thereof.

In addition, it is to be understood that the phraseology and terminology employed herein are for the purpose of description and should not be regarded as limiting. The invention is capable of other embodiments and of being practiced and carried out in various ways. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
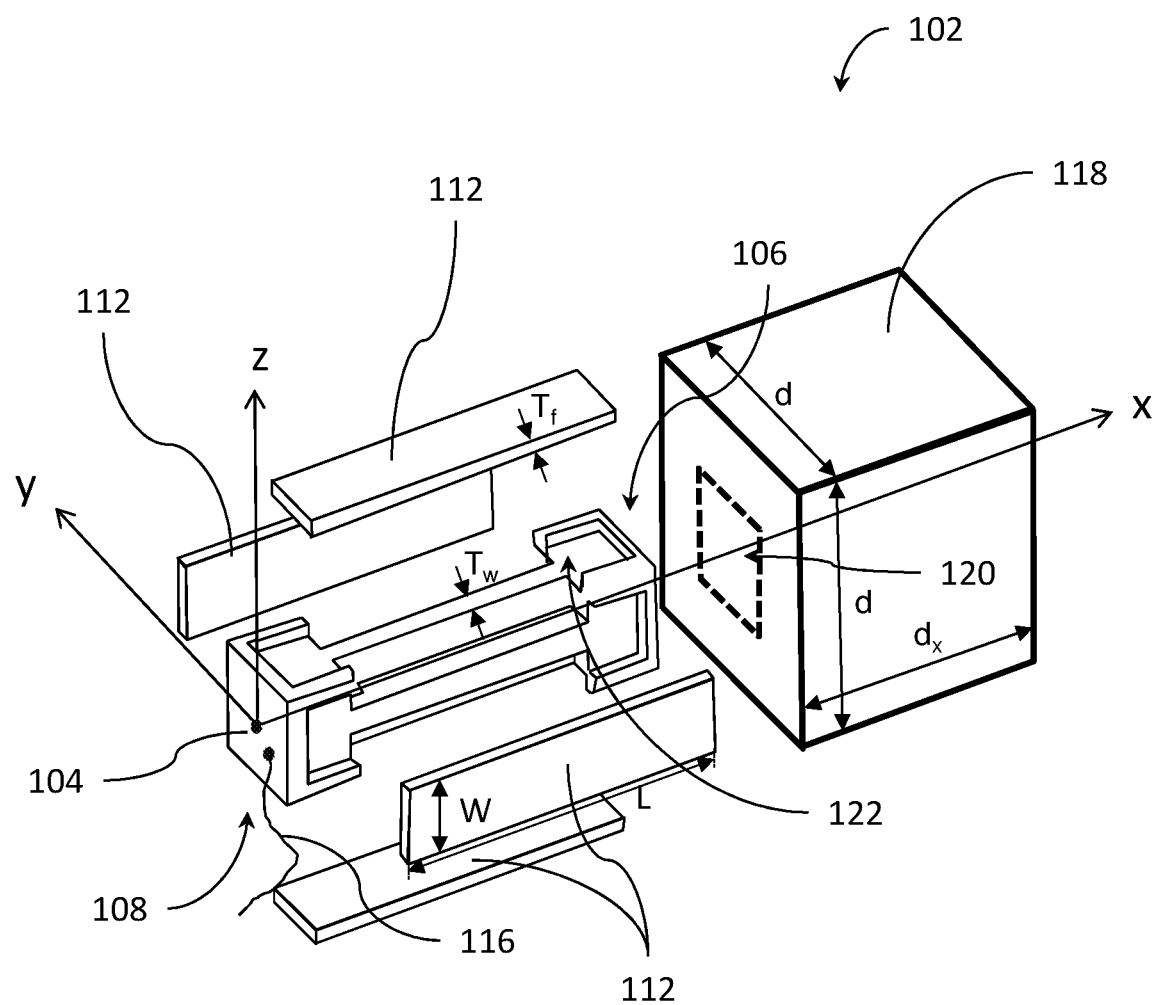
FIG. 1 is an exploded view of a vector sensor.
Figure 2:
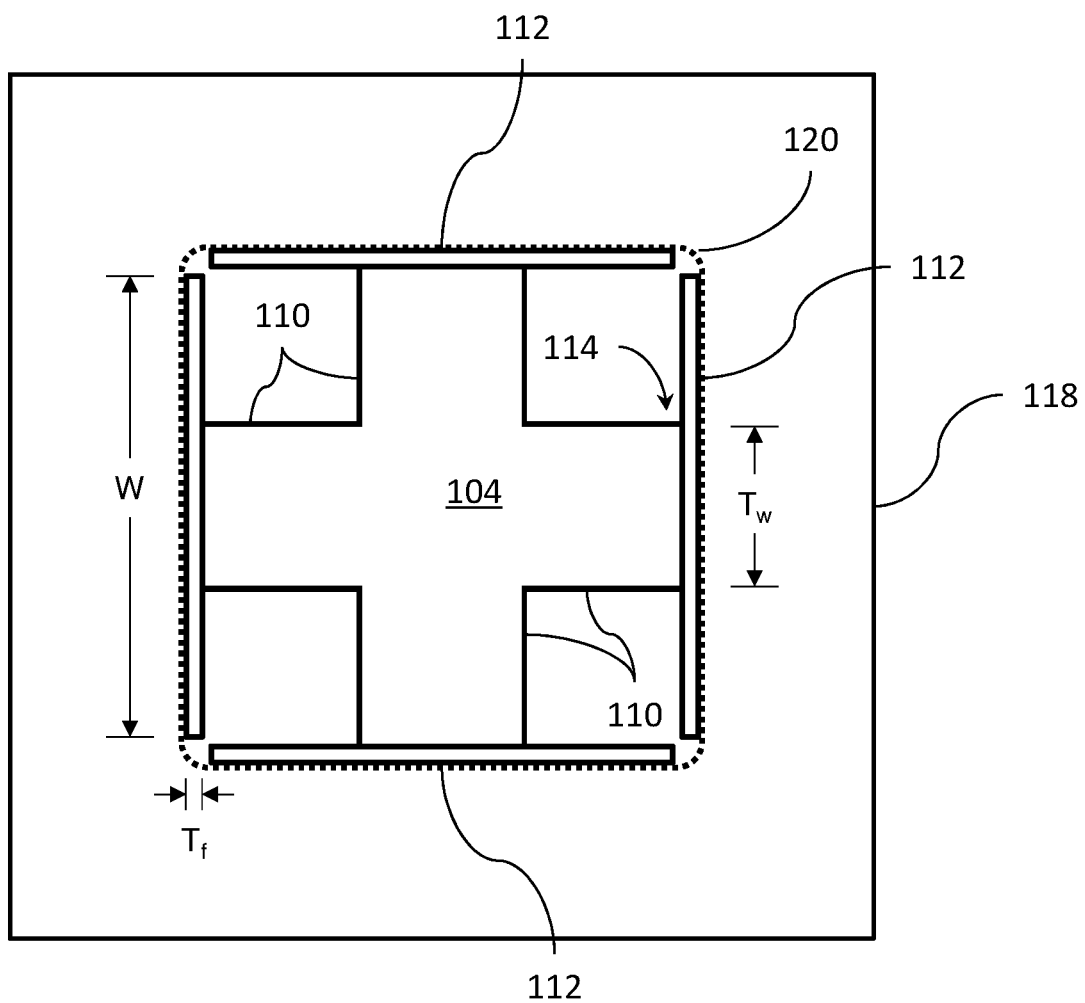
FIG. 2 shows a vector sensor embedded in a proof mass.

A compact dual beam vector sensor disclosed herein responds to accelerations via flexure about two axes of mid-surface rotation. Referring to FIG. 1, a vector sensor 102 includes a central structural member 104 having a first end 106 and a second end 108. In the cross-sectional view, the structural member 104 resembles two I-beams oriented at ninety degrees to one another, creating a uniform "plus-sign," or cross-shaped cross section, as shown in FIG. 2.

In other words, the central structural member 104 has four arms 110. The arms 110 are oriented at 90° to each other. The structural member 104 may be constructed from a non-conducting material, such as MACOR. Other appropriate, non-conducting materials can be used. Plates 112 surround the central structural member 104. The plates 112 make up the sensing elements and comprise the outer flanges of the vector sensor. A plate 112 is attached to the distal end 114 of each arm 110 of the structural member 104. Epoxy, or other appropriate adhesive, may be used to bond the plates 112 onto the distal end 114 of each arm 110. The plates 112 may be made of a piezoelectric material comprising single crystal plates, such as relaxor plates.

A wire 116 is inserted into the second end 108 of the central structural member 104. The wire 116 may be attached to each of the plates 112 by conducting epoxy or conducting ink prior to assembly. In some embodiments, the wire 116 may be a fine and stranded signal wire.

A proof mass 118 contains a socket 120. The first end 106 plugs into the socket 120. The proof mass 118 may be fabricated from a high-density metal, such tungsten. Epoxy, or other appropriate adhesive, may be used to bond the components of the vector sensor 102 including the proof mass 118.

The dimensions of the plates 112 and the central structural member 104 determine the length and depth of the structure of the vector sensor 102. The stiffness of the vector sensor 102 and the mass of the proof mass 118 determine the resonance frequency. As shown in FIG. 1, the structural member 104 includes a shaped depression 122 at the first end 106 and the second end 108.

The shaped depression 122 is sized and configured to hold the plates 112. Each plate 112 has a length L, a width W, and a thickness $T_f$. The shaped depression 122 has a horizontal width H corresponding to the width W of the plates 112. The arms 110 of the structural member 104 have a thickness $T_w$. The proof mass 118 may be a cube having a dimension d for each side.

Figure 3:
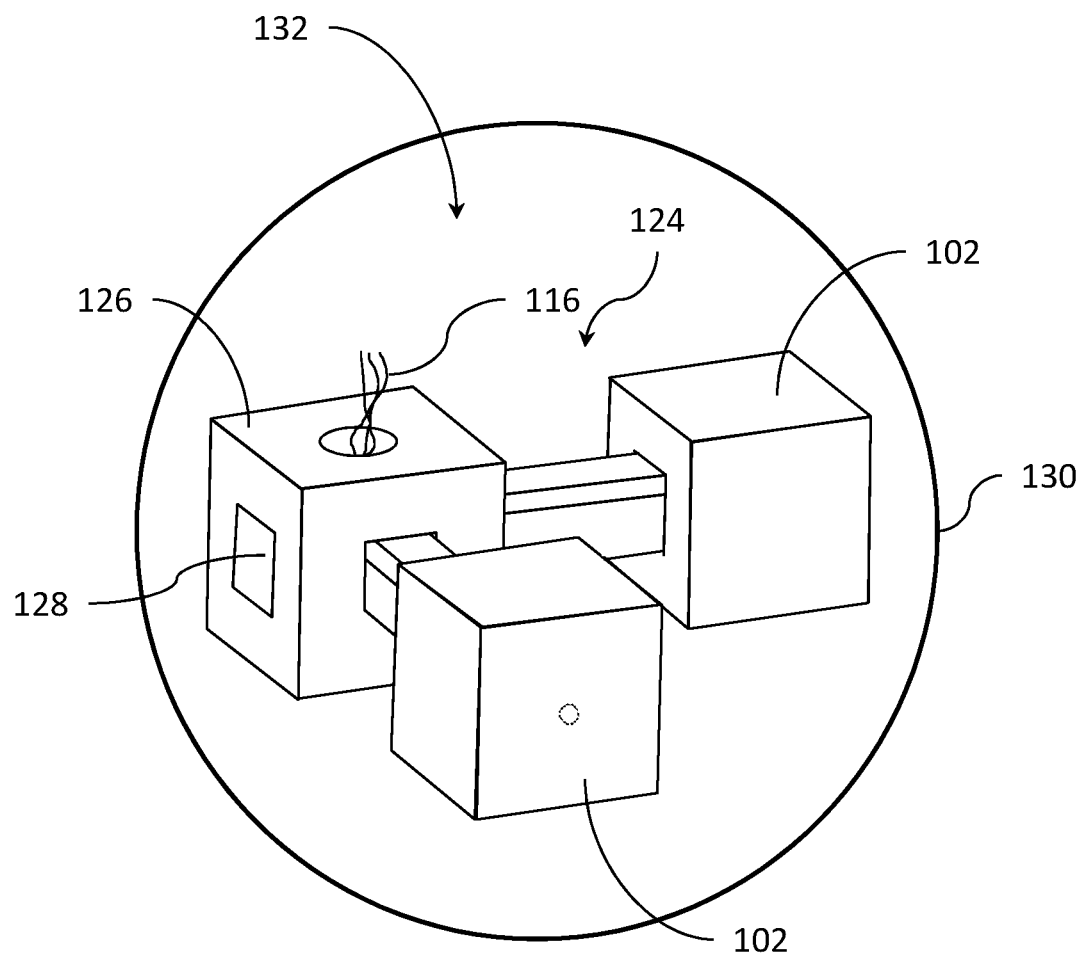
FIG. 3 shows a dual beam vector sensor assembly.

For the three-component response, two beams are used, oriented at ninety degrees relative to each other. FIG. 3 depicts a dual beam vector sensor assembly 124. Two vector sensors 102 are connected to a base piece 126. That is, the second end 108 of each structural member 104 is embedded in an aperture 128 in a side of the base piece 126 such that vector sensors 102 have 90 degree rotational symmetry about the axis of the vector sensor 102 (the x-axis in FIG. 1). This symmetry ensures that the responses in the z-direction and the y-direction are identical. The base piece 126 may be made of a relatively light metal, such as aluminum.

Figure 4:
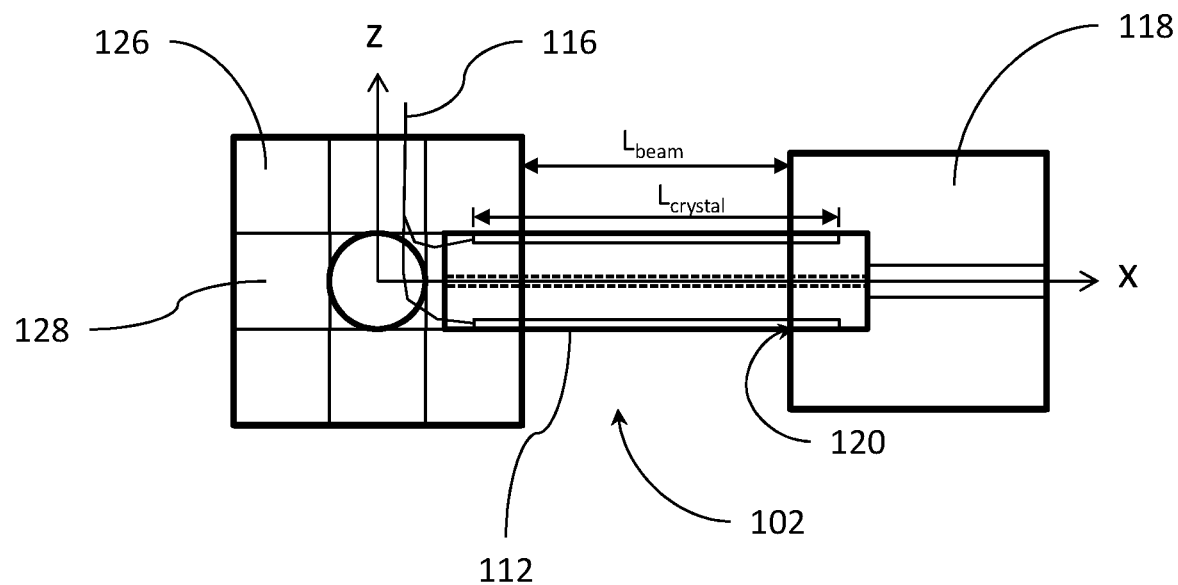
FIG. 4 is a cross-section of a vector sensor and vector sensor beam.

Referring to FIG. 4, a cross-section of a vector sensor 102 in the x-z plane shows that the plates 112 are constrained by insertion into the socket 120 of the proof mass 118. This constraint provides for a more secure boundary condition that inhibits de-bonding of the plates 112 from peeling and provides a greater surface area for epoxy bonding. The effective length of the vector sensor beam ($L_{beam}$) is the length of the plate ($L_{crystal}$) minus the length of the portion that is embedded in the socket 120. This leads to a reduction in sensitivity as the charge generated by the strained part of the plate 112 is distributed over the electrode face, including the unstrained part of the plate 112 inside the socket 120.

Single crystals are known to produce very high piezoelectric stress and strain coupling coefficients. For low frequency and high resolution sensing, the coupling coefficient for the piezoelectric material of the plates 112 should be maximized and the dielectric and mechanical loss in the piezoelectric material of the plates 112 should be minimized. A very low noise (voltage and current) voltage preamplifier can be employed, such that the magnitude of the capacitive reactance of the vector sensor 102 matches the input noise impedance of the preamplifier.

The shear coupling coefficient has the largest value of the coefficients determined from various crystal cuts and poling directions. It has been determined that the 3,2 extensional mode of <001>-poled PMN-28% PT crystal provides the most robust signal generator. The effective coupling coefficient is $$d_{32} = -569 \frac{pC}{N}.$$

This value compares to values on the order of $$d_{31} = -200 \frac{pC}{N}$$

for the highest value of the extension mode coefficient produced in lead zirconate titanate (PZT) ceramics.

The negative sign indicates that a tensile stress (positive stress) in the 2-direction generates a negative voltage in the 3-direction. The dielectric coefficient is very high, $\in_{33} = 5600 \in_0$. Electrodes comprising a combination of layers consisting of about 3000 Angstroms of gold over about 500 Angstroms of chromium can be applied to the plates 112 during crystal production prior to applying the poling field and, therefore, define the poling direction.

Several configurations for a dual beam vector sensor assembly were analyzed to determine the modal frequencies and the terminal voltages. The design enables the resonance frequency to be tunable to specific applications. The terminal voltage was generated by a single frequency acceleration excitation having an amplitude equal to the equivalent acoustic particle acceleration at the noise floor. The assumed noise floor was 40 dB in the range of 15 Hz to 500 Hz. Four acceleration amplitudes were used: 0.64 ng @15 Hz, 4.3 ng @ 100 Hz, 8.6 ng @ 200 Hz, 12.9 ng @ 300 Hz, and 17.2 ng @ 400 Hz. The excitation was applied equally in the three component directions (x, y, and z of FIG. 1).

Table 1 shows the results for a resonance frequency $f_o$ and 40 dB-generated acceleration voltage for the beam along with the effective dimensions of a variety of configurations. The dimensions are defined in FIG. 1 and FIG. 4.

TABLE 1

Dimensions (in millimeters) and 40 dB signal voltage

| Cfg No. | $T_f$ (mm) | H (mm) | d (mm) | dx (mm) | $f_o$ | mass (gram) | $V_{40dB@15Hz}$ (nV) | $V_{40dB@100Hz}$ (nV) | $V_{40dB@400Hz}$ (nV) |
|---|---|---|---|---|---|---|---|---|---|
| 1 | 0.50 | 4.2 | 10.0 | 10.0 | | 36.94 | 0.94 | 6.28 | |
| 2 | 0.50 | 7.4 | 11.4 | 15.0 | | | 1.23 | 8.22 | 35 |
| 3 | 0.75 | 5.3 | 11.4 | 13.5 | | 64.39 | 1.58 | 10.6 | 45 |
| 4 | 0.75 | 6.2 | 11.7 | 15.2 | | 76.11 | 1.71 | 11.4 | 49 |
| 5 | 1.00 | 5.0 | 10.7 | 14.8 | | 62.67 | 1.94 | 13 | 56 |

Constants

| $L_{beam}$ | W | $T_w$ | $\rho_{mass}$ | $\rho_{core}$ | $\rho_{pmn}$ | $Z_{MN2310}$ | $Z_{LT1129}$ |
|---|---|---|---|---|---|---|---|
| 10 mm | 2.8 mm | 1.2 mm | 17800 kg/m³ | 2520 kg/m³ | 8095 kg/m³ | | |

Figure 5:
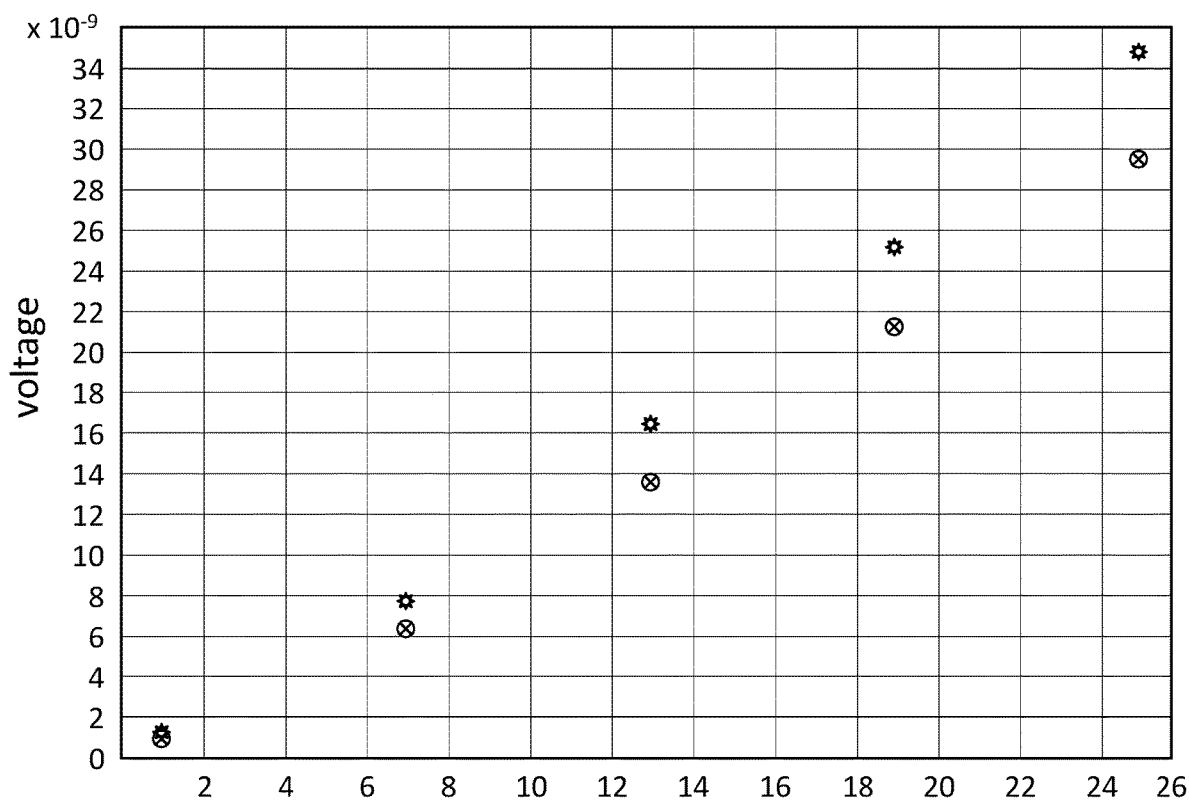
FIG. 5 is a graph of voltages generated by a single frequency excitation equal to noise level accelerations.

FIG. 5 shows the voltages generated on the four sensor terminals by a single frequency excitation equal to the noise level accelerations and corresponding to the physical configuration #2 in Table 1. The acceleration had equal components in the x-, y-, and z-directions. The coupling of the extensional mode and the flexural mode is manifested as the difference between the top and bottom and left and right electrodes.

Referring again to FIG. 3, the dual beam vector sensor assembly 124 includes two vector sensor beam elements mounted orthogonally. The dual beam vector sensor assembly 124 may be mounted inside a compact package comprising an enclosed housing 130 defining an interior 132, such as spherical shell.

The shell can consist of two hemispheres assembled in a vacuum and sealed at their circumferential joint. The enclosed housing 130 should be sized to achieve neutral buoyancy. Since the minimum dimension is dictated by the distal corners of the proof masses; the package will likely require additional ballast to meet the neutral buoyancy requirement. The weight can be adjusted through the addition of low-density foam or internal electronics.

Figure 6:
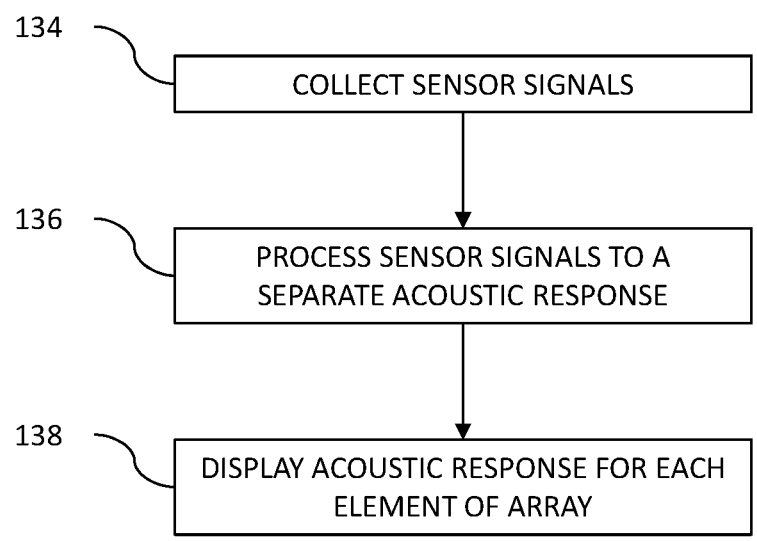
FIG. 6 is a flow diagram illustrating the methodology herein.

FIG. 6 is a flow chart illustrating a specific embodiment of the invention herein. According to an aspect of the invention, in a method, at step 134, sensor signals representative of sensed acoustic velocity are collected from a plurality of dual beam vector sensors. The plurality of dual beam vector sensors comprises an array of acoustic sensing elements. Each dual beam vector sensor includes a pair of vector sensor beams mounted orthogonally to each other.

At step 136, the sensor signals are processed to a separate acoustic response for each element of the array of acoustic sensing elements. At step 138, the acoustic response for each element of the array of acoustic sensing elements is displayed on a display device.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described.

It should be recognized that, in the light of the above teachings, those skilled in the art could modify those specifics without departing from the invention taught herein. Having now fully set forth certain embodiments and modifications of the concept underlying the present disclosure, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

Finally, any numerical parameters set forth in the specification and attached claims are approximations (for example, by using the term "about") that may vary depending upon the desired properties sought to be obtained by the present disclosure. At the very least, and not as an attempt to limit the application of the doctrine of equivalents to the scope of the claims, each numerical parameter should at least be construed in light of the number of significant digits and by applying ordinary rounding.

What is claimed is:

1. A dual beam vector sensor for responding to accelerations via flexure about a x-direction and a y-direction, said dual beam vector sensor assembly comprising:
   a first neutrally buoyant and cubic proof mass having a socket indented along a face of said first proof mass wherein tungsten is a material of said first proof mass;
   a first non-conducting and central structural member with a first end having at least four shaped depressions and with a second end having at least four shaped depressions, said structural central member further having four arms oriented at 90° to each other to form a cross-shaped section on a longitudinal axis between the first end and the second end of said structural central member;
   a first plurality of crystalline plates comprising a portion of gold and chromium material, with a face of each of said crystalline plates affixed to a distal end of each said arm of said first structural central member and held by width in each of the shaped depressions of the first end of said first structural central member and in each of the shaped depressions of the second end of said first structural central member wherein said crystalline plates are a first set of sensing elements and a first set of outer flanges of said vector sensor;
   an aluminum and cubic base piece having a first aperture in a center of a first vertical face of said base piece and a second aperture in a center of a second vertical face of said base piece wherein the second end of said first central structural member is embedded in the first aperture of said base piece to define the x-direction;
   a second neutrally buoyant and cubic proof mass having a socket indented along a face of said second proof mass wherein tungsten is a material of said second proof mass;
   a second non-conducting and central structural member with a first end having at least four shaped depressions and with a second end having at least four shaped depressions with said second structural member further having four arms oriented at 90° to each other to form a cross-shaped section on a longitudinal axis between the first end and the second end of said second structural member;
   a second plurality of crystalline plates comprising a portion of gold and chromium material, with a face of each of said second plurality of crystalline plates affixed to a distal end of each said arm of said second structural member and held by width in each of the shaped depressions of the first end of said second structural central member and in each of the shaped depressions of the second end of said second structural central member wherein said crystalline plates are a second set of sensing elements and a second set of outer flanges of said vector sensor;
   a spherical shell of two hemispheres sealed at a circumferential joint and enclosing said base piece, said first proof mass, said second proof mass, said first plurality of crystalline plates and said second plurality of crystalline plates;
   wherein the first end of said first structural member is inserted into the socket of said first proof mass and the first end of said second structural member is inserted into the socket of said second proof mass;
   wherein the second end of said second structural member is embedded in the second aperture of said base piece to define the y-direction;
   wherein said first set of sensing elements and said second set of sensing elements have a 90 degree symmetry around said base piece to ensure that responses in the z-direction and the y-direction are identical and are capable of providing a boundary condition that inhibits de-bonding of the plates.

\* \* \* \* \*